May 3, 1938. F. W. COTTERMAN 2,116,234
AUTOMATIC OVERDRIVE GEARING
Filed Nov. 18, 1936
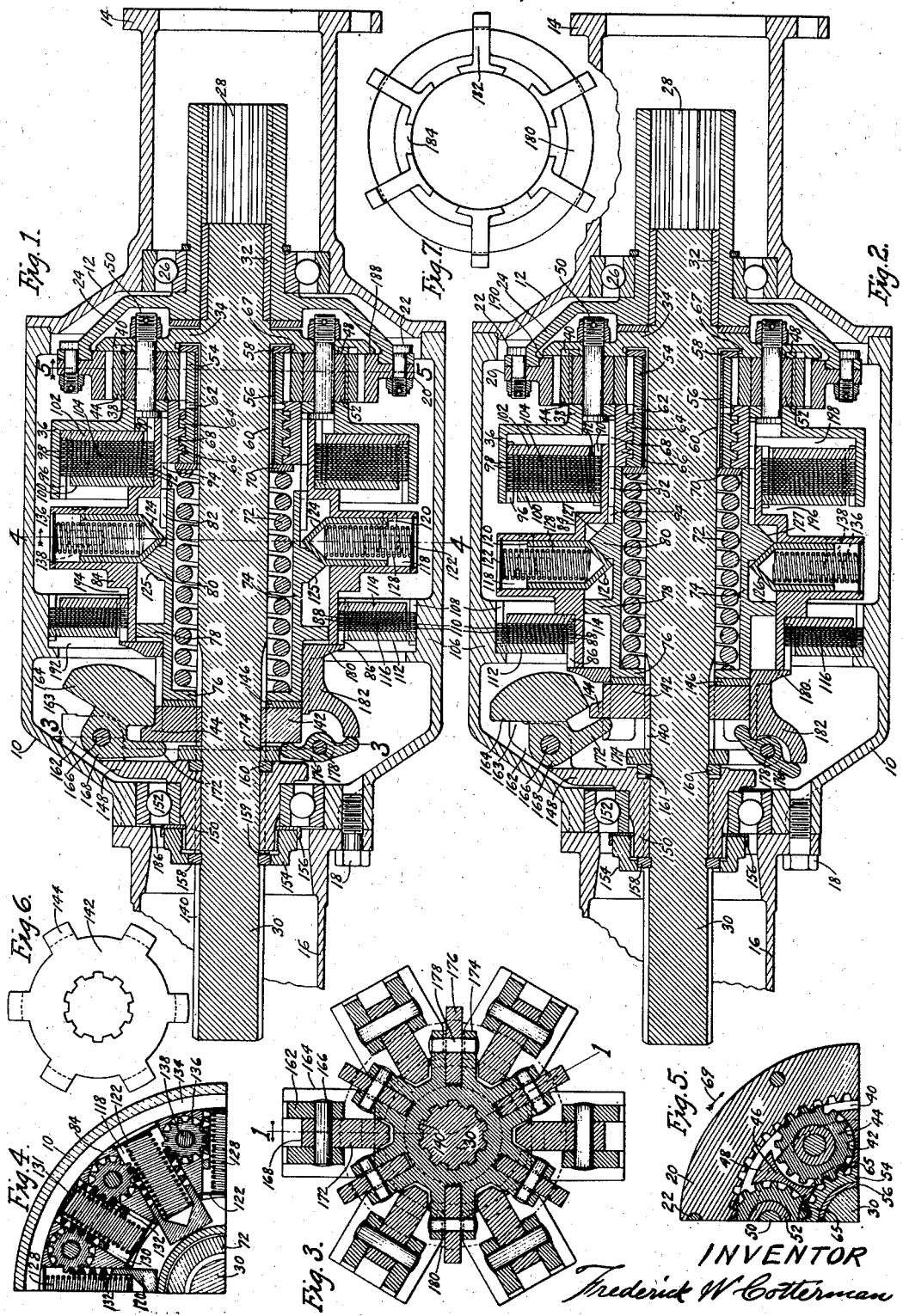
INVENTOR
Frederick W. Cotterman Patented May 3, 1938

2,116,234

UNITED STATES PATENT OFFICE 2,116,234

AUTOMATIC OVERDRIVE GEARING

Frederick W. Cotterman, Dayton, Ohio, assignor of one-half to Bessie D. Apple, Dayton, Ohio Application November 18, 1936, Serial No. 111,460

17 Claims. (Cl. 74—260)

This invention relates to overdrive gearing and belongs to that general class of gear mechanism now in commercial use wherein a supplementary shaft between the transmission and the rear axle of a motor vehicle is drivable by speed increasing gearing whereby a given speed of the motor vehicle is attainable with less engine speed, when the load conditions are such that the maximum engine power is not required with the engine and vehicle coupled in direct drive.

Overdrive gear sets are now commercially available to vehicle manufacturers in several types varying mainly in the mechanism provided for rendering the speed increasing gearing operative or permitting it to remain passive, as desired, some of these gear sets being brought into action manually, some by vacuum means, and some by centrifugal weight means, the latter being the most widely used.

In the commercial centrifugally operable gearsets there is usually a positive clutch, operable into engagement by the centrifugal device anytime after a predetermined speed is exceeded, to connect the drive through the speed increasing gears, but in order to cause this action to take place it is necessary that the operator momentarily release the accelerator pedal to thereby create a zero torque condition. If, then, he fails or neglects to determine when an overdrive connection is advisable and thereupon brings it into play he may do considerable driving in direct drive under load conditions for which the overdrive connection would be preferable.

It is therefore an object of this invention to provide an overdrive mechanism which will, per se, sense the then existing load condition at any speed and shift to overdrive without attention of the operator, if load conditions are such that such shift is then advisable.

Furthermore, these commercial centrifugally operative gear-sets, being speed responsive only, have a fixed vehicle speed usually 40 M. P. H., at which they will change from overdrive back to direct drive, and in using them it often happens that an operator, driving say at 70 M. P. H., has been compelled for some reason, to slow to 50 M. P. H., and then wishes to accelerate back to 70 M. P. H., in as short a time as possible. Under these conditions the operator may do one of two things, either of which is at fault, that is, he may accelerate from 50 to 70 M. P. H., in overdrive, which he must do with about 70% of the power available in direct drive, or he may purposely first decelerate to 40 M. P. H., to cause the mechanism to shift back to direct drive then accelerate from 40 to 70 M. P. H., in direct drive.

It is therefore another object of this invention to provide overdrive mechanism comprising means to measure the existing load condition both when direct drive is in effect and when overdrive is in effect and to shift from one to the other when load conditions warrant and shift irrespective of the speed of the vehicle at that time.

Still further, the centrifugally operable overdrives now available now comprise a positive clutch operable into engagement by the centrifugal means upon release of the applied power to connect the overdrive gearing and speed up the overdrive shaft, but have a roller clutch for overrunningly connecting to the overdrive shaft for driving it directly when it is not being driven through the speed increasing gears. The result is that as long as direct drive is in effect this overrunning clutch acts as a free wheeling unit, the result being that drivers, who wish to have the benefit of an overdrive, must accept free wheeling whether they like it or not, and free wheeling has become very unpopular with a great many drivers.

It is therefore another object of this invention to eliminate all roller or similar overrunning clutches which not only are a source of trouble, due to the fact that they may wear faster than the rest of the mechanism, but further because they provide the free wheeling condition much disapproved by drivers, and to provide instead only simple friction clutches of small dimensions which are self adjustable for wear and which may become operative at the right time without releasing the applied power and therefore without attention of the operator.

In mechanisms of the kind herein shown, wherein a shift from one friction clutch to another is required it is highly desirable that the clutch which is at the moment engaged be fully engaged while the other is fully disengaged, up to the instant that a shift begins, but that, once begun, a shift must inevitably take place.

It is therefore another object of this invention to provide mechanism for shifting from one friction clutch to the other which maintains full pressure on the one clutch and no pressure on the other up to the instant that a shift begins, and which will be such that a shift will then be carried out regardless of any change in the load conditions or anything the operator may do, to the end that there will be no intermediate position in which the mechanism may pause and operate with both or either clutch only partly engaged.

Another object is to provide such an arrangement of the plate friction clutches that a small number of plates of exceptionally small dimensions will transmit an unusual amount of torque.

Other objects and advantages will become apparent as the invention is described in detail and reference is made to the drawing wherein—

Fig. 1 is a longitudinal axial section through the overdrive mechanism in the normal or direct drive condition.

Fig. 2 is a longitudinal axial half section through the mechanism when it is shifted for overdrive.

Fig. 3 is a transverse section through the clutch operating mechanism taken on the line 3—3 of Fig. 1.

Fig. 4 is a quarter of a transverse section through the clutch shifting mechanism taken at 4—4 of Fig. 1.

Fig. 5 is a quarter of a transverse section through the gearing taken at 5—5 of Fig. 1.

Fig. 6 is a detail front view of the clutch shifting collar.

Fig. 7 is a detail front view of the clutch pressure plate.

Similar numerals refer to similar parts throughout the several views.

The mechanism herein shown employs some of the features of the mechanism shown in my co-pending application, Serial Number 101,093, filed September 16, 1936, but has a number of improvements both in its operating means and in the manner of its application.

While the mechanism herein shown may be adapted for use in any position between the regular transmission and the rear axle of a conventional motor vehicle, the embodiment shown is intended to be applied by shortening the torque tube and drive shaft of the vehicle an amount equal to the length of the device, and then making the rear end of the device correspond in contour and position to the original torque tube and drive shaft. To this end the housing 10 has a rear cover 12 which carries a flange 14 at the rear end, corresponding to the rear end of the original torque tube of the vehicle, while the front of the housing has the shortened torque tube 16 attached by means of screws 18.

The overdrive gearing comprises a ring gear 20 which is secured by bolts 22 to the driven member 24. The driven member 24 is supported in the housing cover 12 by means of the ball bearing 26. This ball bearing should be of the type capable of carrying the maximum in thrust load, the radial load being negligible. The rear end of driven member 24 has internal splines 28 which correspond to the rear end of the original drive shaft and will therefore fit slidably over the external splines of the shank of the bevel drive pinion of the rear axle.

The driving shaft 30 is rotatably supported in the bearing bushing 32 which is press fitted in the driven member 24. Integral with the drive shaft 30 is the planet pinion carrier flange 34.

The clutch drum 36 has a large hub 38 which is counterbored to fit into a groove 40 in the carrier flange. The greater part of the large hub 38 is, however, cut away as at 42 to make room for the six planet pinions 44, leaving only the six partitions 46 (see Fig. 5) extending between the planet pinions. These partitions however, each have a part 48 which fits into the groove 40 to hold the clutch drum 36 in concentric relation with the carrier flange 34.

Six bolts 50 extend through the clutch drum 36 and the carrier flange 34 centrally of the cut away spaces 42 and six bearing bushings 52 surround the bolts. The bushings 52 are preferably long enough to be clamped endwise between the drum and flange. The six planet pinions 44 are runningly fitted to the outside of the bushings 52 and positioned to be properly meshed with the ring gear 20.

The externally toothed sun gear 54 is in constant mesh with the planet pinions 44. A bearing bushing 56 is press fitted into the sun gear. Bushing 56 has an integral head 58 which takes the sun gear end thrust. Oil grooves 60 extend axially through the bushing and radially through the head. Oil holes 62 further aid free circulation of oil.

The partitions 46, (see Fig. 5) are fitted closely up to the leading side of the planet pinions 44 but have a clearance between the partition and the trailing sides of the pinions. The inner edges of the partitions 46 also fit up closely to the outer diameter of the sun gear 54. Small holes 65 in the forward face of the carrier flange 34 communicate with the circular groove 67 in the carrier flange (see Figs. 1 and 2) which in turn communicates with the oil grooves 60.

Since the gears rotate in the direction of the arrow 69 Fig. 5, any oil getting to the gear teeth will be pumped through the small holes 65 to the oil grooves 60. The gears have helical teeth, the sun gear helix being right hand. This assists in forcing the oil axially toward the holes 65.

The hub of the sun gear has a coarse pitch square thread 64 over which the nut 66 is freely fitted. The outside of the nut 66 has a series of circumferentially spaced axially extending splines 68. A washer 70 of suitable bearing metal is urged by the heavy spring 72 against the end of the nut 66.

Immediately surrounding the spring 72 is the clutch and brake operating cylinder 74 which at the forward end has an inturned flange 76 which holds it concentric with the shaft 30. Intermediate the ends and extending outwardly are the supporting flange 78 and the shift ring 80. At the extreme rearward end the cylinder has circumferentially spaced axially extending splines 82 corresponding to the splines 68.

Surrounding the clutch and brake operating cylinder 74 is the clutch and brake friction plate carrying member 84. Member 84 has external splines 86 at the forward end and a series of brake plates 88 are internally toothed to fit over splines 86. At the rear end the member 84 has external splines 90 and a series of clutch plates 92 are internally toothed to fit over splines 90. The rear end of member 84 is also internally splined at 94 to fit slidably over the external splines 82 and 68, whereby the member 84, the nut 66 and the cylinder 74 are always connected to rotate in unison although either is free to move axially without moving the others.

The clutch drum 36 has internal splines 96 into which the external teeth of a series of clutch plates 98 are slidable. The clutch plates 98 are contained in the spaces between the clutch plates 92. The two outside clutch plates 100 and 102 are thicker than the others. The complete clutch may be broadly designated by the numeral 104.

The housing 10 has an integral brake plate supporting ring 106 which has internal splines 108 into which the external teeth of the brake plates 110 are slidable. The plates 110 are contained in the spaces between the brake plates 88. The two outside brake plates 112 and 114 are thicker than the others. The brake may be broadly designated by the numeral 116.

Intermediate the brake 116 and the clutch 104, in the member 84, are a plurality of radial openings 118. Into six of these openings the clutch and brake pressure plungers 120 are slidably fitted. The outer end of each opening containing a plunger 120 is closed by a plate 122 which extends into a groove near the end. The plungers 120 are hollow cylinders with the inner ends closed, the closed ends being beveled off as at 124 and 126. These ends are adapted to bear on the shift ring 80 which is not truly circular but is flattened at points around its circumference to provide six pairs of sides 125 and 127 for the six plungers. Pressure springs 128 urge the plungers 120 inwardly. Six counterweights 130 (see Fig. 4) are slidable in the other six radial openings 118. The inner ends of these openings are also closed by plates 122. The counterweights 130 are hollow cylinders closed at the outer ends at 131. Additional pressure springs 128 urge the counterweights 130 outwardly.

Opposite edges both of the plungers 120 and the counterweights 130 are cut across to provide the rack teeth 132. A series of axially parallel circumferentially equally spaced openings 134, Fig. 4, let in the small pinions 136 to an extent which brings the center of the pinion thickness on the plane of rotation of the plungers and counterweights, that is, on the line 4—4 of Fig. 1. Studs 138 are provided to rotatably support the pinions. Through this arrangement, an outward movement of the plungers 120 causes an inward movement of the counterweights 130 through the rack and pinion connection. Each plunger 120 is therefore pressed inwardly by the force of two pressure springs 128.

The counterweights 130 are provided because a spring force which would be adequate to hold the plungers 120 pressed inwardly with a suitable clutch or brake engaging pressure at 50 M. P. H., would be more than neutralized by the centrifugal force of the plungers at 70 M. P. H. This is true even when the plungers 120 are made as light as mechanically practicable.

The forward end of the driving shaft 30 has the external splines 140. A shifting collar 142 is internally splined to fit slidably over the shaft splines 140. Six lugs 144 are equally spaced around the periphery of the collar (see Fig. 6).

A thrust washer 146 of suitable bearing metal is interposed between the shifting collar 142 and the inturned flange 76 of the cylinder 74. Further forward on the driving shaft 30 is the centrifugal weight carrying spider 148 which has a forwardly extending hub 150, internally splined to fit over the splines 140.

A ball bearing 152 is press fitted on the hub 150 and is held thereon by the nut 154 and lock washer 156. This ball bearing is a duplicate of the ball bearing 26 but is turned to take thrust in a direction axially opposite. At the ends of the hub are the split rings 158 and 160, fitted into square grooves in the shaft 30. The halves of the ring 158 are held together by virtue of the fact that a portion of the nut 154 fits closely over them, while the halves of the ring 160 are held together because they are in a counterbored recess in the spider 148 itself. The rings 158 and 160 are so located as to permit slight axial movement of the weight spider 148 on the shaft 30, rearward movement of the spider producing the gap 159 and forward movement producing the gap 161.

The legs of the weight spider 148 each have a pair of ears 162 between which the centrifugal weights 164 are hinged by the hinge pins 166. The outer ends of the ears 162 are shaped and positioned to provide stops 163 to limit outward swinging of the weights.

The weights 164 each have an integral hinge 168 and work arm 172. The fact that both the weight spider 148 and the shifting collar 142 are fitted to the same splines 140 of the driving shaft 30 insures that the work arms 172 of the weights will always register with the lugs 144 of the shifting collar.

Between the weight spider 148 and the shifting collar 142 and having also internal splines fitted to the shaft splines 140 is the clutch pressure spider 174. The legs of the spider 174 are bifurcated to secure the clutch pressure fingers 176 which are swingably held in place by the hinge pins 178.

The clutch pressure plate 180 has six integral ribs 182 (see Fig. 7) which remain in registry with the fingers 176 because of the fact that the lugs 144 of the shifting collar 142 are slidable in the spaces 184 of the plate. The outer ends of the fingers 176 bear on the ends of the ribs 182 while the inner ends of the fingers bear against the face of the shifting collar 142.

*Proportion*

While the device herein shown may be proportioned for use with an engine of any desired power, some directions for proportioning the device for a known power may preferably be given.

By taking the outside dimensions of the housing 10 as 7½" and making all other parts to the same scale, the mechanism will be suitable for use with an engine of 110 H. P., at 3600 R. P. M., a rear axle having a 4⅓ to 1 engine-to-wheel ratio, 30" wheels, and a total vehicle weight of about 3500 pounds. Dimensions of some of the parts which may not readily be found by scaling the drawing may preferably be given.

The helix angle of the gear teeth is 45 degrees. The sun gear helix is right hand. The normal diametral pitch is 16. The ring gear has 51 teeth, the sun gear 21 and the planet pinions 15. This will give an engine-to-drive-pinion ratio of $$\frac{51}{51+21} = \frac{.7083}{1.0000}$$

The helix angle of the coarse pitch screw 64 should be 65 degrees with the axis and be right hand. By making the helix angle of the gears as much as 45 degrees, the load on the gears produces a forward thrust which takes substantially half the pressure due to the reaction of the nut 66 off of the head 58 and transfers it through the planet pinions and sun gear to the ball bearing 26. In making the calculations to determine the end thrusts it should be remembered that the pitch line load on the sun gear is considerably greater in direct drive than in overdrive, being $$\frac{\text{(Radius to center of planet pinion)}}{\text{(Pitch radius of ring gear)}} \times$$

(Torque load at center of planet pinion)
when in direct drive, and $$\frac{\text{Torque load at center of planet pinion}}{2}$$

when in overdrive.

This makes the pitch line pressure on the sun gear about 1/16 as great in overdrive as in direct drive. The end thrust will therefore be proportionately less in overdrive.

The brake 116 which holds the sun gear for overdrive, not only has much less frictional area than the direct drive clutch 104, but is never engaged with a greater force than that of the 300 pounds applied by the springs 128, while the pressure on the clutch 104, when engaged, is never less than 700 pounds. The reason is that not only is the maximum pitch line pressure of the sun gear less in overdrive than in direct drive, but the pitch line pressure in direct drive may be multiplied several times when the regular transmission is set in low gear or in reverse.

It will be noticed that the gaps 192 and 194 into which the brake plates may spread when the brake is disengaged and the gaps 196 and 198 into which the clutch plates may spread when the clutch is disengaged are about 1/16″ each. In practice these gaps are made 1/16″ when the device is new so that a great amount of wear may take place before the gaps become as great as shown.

The only difference in the action of the device when the stacks of discs are new and thicker is that the surfaces 124 and 126 of the plungers slide down further over the surfaces 125 and 127 of the shift ring. Thus a large amount of wear may take place without affecting the device, although no manual adjusting means is provided.

The clutch and brake pressure spring 128 should be of .063″ round wire, coiled ½″ pitch diameter, have 14 coils and a free height of 3⅜″.

The main spring 72 is made of 1/16″ round wire coiled 1¾″ pitch diameter, has 9⅜ coils and a free height of 5 1/16″.

Operation

Fig. 1 shows the device as it is when the vehicle is at rest. In this condition the pressure springs 128 are forcing the plungers 120 inwardly so that the beveled faces 126 of the plungers are sliding down the beveled faces 127 of the shift ring 80 and thereby applying a total of 300 pounds axial pressure to the plates of the clutch 104.

The expansive force of the main spring 72 urges the nut 66 rearwardly and the operating cylinder 74 forwardly, each with a force of 400 pounds. The operating cylinder 74 acts through parts 146 and 142 against the inner ends of fingers 176 thereby forcing the outer ends of the fingers against the front ends of the ribs 182 whereby the clutch pressure plate 180 presses against the front end of the friction plate-carrying member 84 thereby applying an additional 400 pounds to the clutch 104, which is therefore now engaged with an axial pressure of 700 pounds.

If power is now applied through the shaft 30 to the carrier flange 34, the tendency of the ring gear due to vehicle resistance, is to remain stationary, and of the sun gear to be rotated in the same direction as the carrier flange $$\frac{24}{7}$$

times as fast as the flange. A clutch large enough to prevent rotation of the sun gear would necessarily be only 7/24, or less than ⅓ the size that would be required to connect the shaft 30 and driven member 24 directly. This, together with the fact that there is 700 pounds pressure on the clutch plates makes it possible to transmit the maximum torque indicated with so small a clutch even when it is being multiplied through the low or reverse gear of the conventional transmission, gear-set to which the overdrive is auxiliary.

If the regular transmission is now set in reverse, the carrier flange 34 will revolve opposite to the direction indicated by the arrow 69, Fig. 5, and the nut 66 will be drawn more tightly to the edge of the sun gear 54. The nut is splinedly connected to the member 84. The sun gear 54 may therefore not rotate with respect to the carrier flange 34 and the whole gear mechanism rotates as a unit with the planet pinions not rotating on their own bearings 52.

There is at this time two gaps 192 and 194 into which the plates of the brake 116 may spread so there will be no tendency of the brake to hold the sun gear against rotation. The ratio of rotation of shaft 30 to driven member 24 is therefore 1 to 1 in reverse gear.

If the regular transmission is set in any forward speed and power applied to the carrier flange 34, the tendency is to rotate the sun gear forwardly in the direction of the arrow 69 at $$\frac{24}{7}$$

times the speed of the carrier flange. If, now, the applied power is little, the nut 66 may remain as it is in Fig. 1, but if the applied power is greater as it is apt to be in accelerating the vehicle from a dead stop, the nut 66 will be screwed forwardly on the threads 64 against the 400 pound resistance of the spring 72 until the forward end of the nut encounters the rearward end of the operating cylinder 74. This movement compresses the spring 72 about ½″ and thereby increases its force from 400 to 500 pounds.

Now the greater the applied power the more the pressure of the clutch 104 will be augmented through the fingers 176. The application of maximum power may cause a clutch pressure of more than a ton.

It should now be noted that the end thrust caused by the nut 66 during this heavy power application is taken in one direction by the carrier flange and in the other by the split ring 160 both fast to the shaft 30. Since the parts thus put under end thrust all rotate together there is no wear on any of the surfaces in contact. There is now a slight gap 186 at the front edge of the ball bearing 152 showing no end thrust on either ball bearing at this time.

However, since the gear teeth are helical and the sun gear is right hand, there is a tendency under load to force the ring gear 20 rearwardly and the sun gear 54 forwardly which would result in all parts carried on shaft 30 moving forwardly to close the gap 186 and put end thrust on the ball bearings. This is prevented by the fact that before this may occur the carrier flange 34 is pressed by the gear thrust against the edge of the ring gear 20 at 188 (see Fig. 1). It will be seen that at no time before a shift to overdrive will there be any end thrust which could cause wear on any of the bearing washers.

As the speed increases the outward force of the weights 164 will first cause the weight spider 148 to move forwardly and close the gap 186. Further increase in the force of the weights will create a forward thrust which will be taken by the bearing 152.

Now in order to shift up from direct drive Fig. 1 to overdrive Fig. 2, it is necessary that a weight force be generated sufficient at least to equal the 400 pound resistance of the main spring 72 plus the 300 pound resistance of the pressure springs 128 plus 30 pound resistance due to friction between the surfaces 126 and 127 of the plungers and shift ring. The minimum weight force which will cause a shift up to overdrive is therefore 730 pounds.

The weights 164 are so proportioned that the force which they generate at 45 M. P. H., will produce an axial pressure at the end of the work arm 172 of 730 pounds.

If then, at 45 M. P. H., the applied power is reduced to as little as 15% of maximum, the main spring 72 will lengthen to its 400 pound length as in Fig. 1, whereupon the combined resistance to a shift up is equalled by the shift up force of the weights. A shift to overdrive Fig. 2 will therefore occur.

By calculation it may be found that if as much as 33% of maximum power is being applied, the nut 66 will bear hard enough against the end of the operating cylinder 74 to prevent a shift up to overdrive until a speed of 60 M. P. H., is reached, and if 80% of maximum power is being applied, the nut 66 will bear hard enough against the end of the operating cylinder 74 to prevent a shift up to overdrive until a speed of 80 M. P. H., is reached.

Inasmuch as the direct drive condition Fig. 1 is adapted for more power and less speed than the overdrive, a mechanism which will cause the direct drive to remain in effect by mere indication that power is then more desirable, that is, by heavy pressure on the accelerator pedal of the vehicle, will be highly effective.

Thus in ascending a grade, if the operator is applying only 33% of his available power and the vehicle nevertheless gains speed until it reaches 60 M. P. H., the direct drive connection is, and ought to be, eliminated in favor of overdrive, because such performance will only be had if the grade is not very steep. On the other hand if, on a steeper grade, the operator is applying 80% of the available power and this amount of power cannot raise the vehicle speed above 79 M. P. H., the direct drive condition will maintain.

But if the vehicle resistance is such that the application of 80% of the available power will raise the vehicle speed to 80 M. P. H., then the shift up will, and should, take place. These points of shift up should, of course, be worked out by consideration of the torque curve of the engine and the vehicle weight, there being no advantage in maintaining the direct drive connection after an engine has reached a speed at which the horse power drops too rapidly with further increase in engine speed.

When a shift up occurs at any point between 45 and 100 M. P. H., the point depending on the power being applied, the weights move out as in Fig. 2. If the power being applied was great enough to have held the nut 66 pressed to the end of the cylinder 74, then a shift up involves pushing the nut rearwardly and rotating the sun gear slightly against its load. If, on the other hand, the power being applied happened to be less than 15% of maximum, the nut 66 would be already in the rearward position Fig. 1, and a shift up would involve only the overcoming of the several springs.

In either event the outward movement of the weight comprises first, the moving forward of the weight spider 148 to close the gap 186 and diminish the gap 159 (see Fig. 1), next moving the shaft 30 and everything mounted on it bodily rearward to finish closing the gap 159 and opening the gap 190 (see Fig. 2) between the carrier flange 34 and the ring gear 20, next, moving the points of the shift ring 80 past the points of the plungers 120 so as to cause the surfaces 124 of the plungers to slide down the surfaces 125 of the shift ring and thereby close the gaps 192 and 194 in the brake 116 (see Fig. 1), and open the gaps 196 and 198 in the clutch (see Fig. 2), whereby the plates of the brake 116 will be compacted and the plates of the clutch 104 made free. The sun gear will now be held against rotation, the planet pinions revolved around it and the shaft 30 will revolve only $\frac{7}{10}$ as fast as the driven member 24.

Now since the main spring 72, when expanded as in Fig. 1, has a force of 400 pounds and when compressed as in Fig. 2, has a force of 500 pounds, it is necessary that the force of the weights in moving out increase slightly faster than the strength of the main spring increases to insure that when the weights once start out they will inevitably move all the way out.

The weights are therefore so proportioned that at 45 M. P. H., the force of the weights is 130 pounds more when in the position Fig. 2 than when in the position Fig. 1, this increase from 730 pounds to 860 pounds being due to the increased distance of the weight from the axis of rotation and the improvement in the leverage through which the force acts. Although the weights in moving out, increase their force from 730 to 860 pounds, the force of 860 pounds remains in effect for but an instant after the weights reach the "out" position, because the brake 116 engages at this instant, whereby the weight rotative speed drops $$\frac{.7083}{1.0000}$$

of its former speed which reduces the weight force to $$\frac{.7083^2}{1.0000^2}$$

or ½ of the former centrifugal force. An instant after shift up the weight force therefore changes from 860 to 430 pounds.

The weight force need not increase to compensate for the increase in the resistance of the pressure springs 128 because this increase is compensated as follows:

In Fig. 4 it will be seen that a plunger 120 is heavier than a counterweight 130, but the plunger is enough closer to the axis than the counterweight to compensate for the difference in their weights and one therefore will balance the other. As a pressure spring 128 is compressed the heavy plunger 120 moves out and the light counterweight moves in, whereby there is an excess in centrifugal force slightly more than enough to overcome the increase in spring strength. There is therefore the seeming anomaly of a spring which may do less work in its compressed state than in its expanded state.

After a shift up to overdrive Fig. 2, the shift back down to direct drive Fig. 1 will occur when the remaining force of the weights 164 plus the resistance of the springs 128 together is less than the force of the main spring 72, or is less than the axially forward pressure of the nut 66 due to applied engine power.

From the dimensions known a calculation may be made showing that the 500 pounds force of the spring 72 alone will overcome the 300 pound force of the springs 128 and the remaining force of the weights 164 at about 30 M. P. H., that is, if no engine power is being applied, a shift down will take place at about 30 M. P. H.

Further calculations may be made to show that at 45 M. P. H., about 60% of full engine power must be applied to cause a shift down and that at 60 M. P. H., about 90% of full engine power must be applied to cause a shift down.

*Advantages*

From the foregoing description and drawing it will be seen that the device disclosed is fully automatic. In the commercially available overdrive gear-sets, the operator must decide when the speed and load conditions are such that he may advisedly shift to overdrive, then he must completely release the accelerator thereby cutting off all engine power and then free wheel for a short time while the change is taking place.

In the device herein disclosed, if the vehicle is moving 60 M. P. H., and the operator allows his applied power to get as low as 33% of maximum, a shift to overdrive will inevitably occur without any act or pause on his part, and the shift is substantially instantaneous. At a higher or lower M. P. H., such shift up will occur when the reduction in applied power is to a proportionately higher or lower percentage of maximum.

This is as it should be for if the load conditions are such that the vehicle can reach a speed of 60 M. P. H., by application of as little as 33% of maximum power that is sufficient indication that the power requirement is light and that overdrive would therefore be advisable. If he has inadvertently allowed the power application to be reduced to 33% at 60 M. P. H., when the conditions are such that he actually needs more power, and a shift up occurs when it is not desirable the operator has only to come down hard enough on the accelerator to apply 90% of maximum torque for one instant and a shift back to direct drive will occur whereupon he may maintain direct drive by keeping more than 33% of full power applied.

Having described my invention, I claim—

1. Power transmission mechansm comprising, a driving member, a driven member, a gear train, means for connecting said members to revolve at the same speed, a second means for connecting said members through said gears to revolve at different speeds, a coarse pitch screw on one of said gears, operative by and in proportion to the torque being carried by said gear, to constantly urge the first connection to remain or become effective and second connection to remain or become ineffective, and helical teeth on said one gear of the same hand but less angle with the axis of the gear than said screw, whereby the end thrust due to the screw is carried partly by the end of the gear and partly by the said helical gear teeth.

2. Power transmission mechanism comprising a driving member, a driven member, a gear train, means for connecting said members to revolve at the same speed, a second means for connecting said members through said gear train to revolve at different speeds, an operating member movable axially in one direction to make the second connection and in the other direction to make the first connection, centrifugal weights at one end of said operating member adapted upon outward movement to move said operating member axially to make the second connection, a coarse pitch screw at the other end of said operating member, rotatable by one of said gears, when the second connection is made, by the torque being transmitted through said one gear to revolve said screw and move said nut axially against said operating member thereby to move said operating member axially in the other direction to effect the first connection.

3. Power transmission mechanism comprising, a driving member, a driven member, gears, means for connecting said members through said gears to revolve at the same speed, a second means for connecting said members through said gears to revolve at different speeds, an operating member movable in one or the other direction to respectively make the second or first connection, centrifugal weights for moving said operating member in the one direction to make the second and unmake the first connection, a coarse pitch screw rotatable by one of said gears by the torque load on said gear when either the second or first connection is in effect, and a nut on said screw movable by turning of said screw to urge said operating member to prevent the second connection being made or to unmake it after it has been made.

4. Power transmission mechanism comprising, a driving member, a driven member, gears, means for connecting said members through said gears to revolve at the same speed, a second means for connecting said members through said gears to revolve at different speeds, an operating member movable in one or the other direction to respectively make the second or first connection, centrifugal weights operable outwardly for moving said operating member in the one direction to make the second and unmake the first connection, a coarse pitch screw rotatable by one of said gears by the torque load on said gear, operative when either of said connections is in effect, a nut on said screw movable by turning of said screw to urge said operating member to prevent the second connection being made or to unmake it after it is made, and resilient means operable to return said weights and said nut to their unoperated position.

5. Power transmission mechanism comprising, a driving member, a driven member, gears, means for connnecting said members through said gears to revolve at the same speed, a second means for connecting said members through said gears to revolve at different speeds, an operating member movable in one direction to make the second and movable in the other direction to make the first connection, centrifugal weights operable outwardly for moving said operating member in the one direction to make the second and unmake the first connection, a coarse pitch screw rotatable by one of said gears by the torque load on said gear, operative when either connection is in effect, a nut on said screw movable by turning of said screw to urge said operating member to prevent the second connection being made or to unmake it after it is made, and a resilient means operable in two directions, the one direction to return the weights and the other to return the nut to their unoperated positions.

6. Power transmission mechanism comprising, a driving member, a driven member, gears, means for connecting said members to revolve at the same speed, a second means for connecting said members through said gears to revolve at different speeds, an operating member movable in one direction to make the second and in the other direction to make the first connection, centrifugal weights operable outwardly to move said operating member in the one direction to make the second and unmake the first connection, torque responsive means on one of said gears adapted under torque load to hold said operating member to prevent the second connection being made or to move said operating member to cause said second connection to be unmade after it has been made, and a spring expansible in two directions, the one to oppose said torque responsive means and the other to return the operating member to the first position and the weights to their unoperated position.

7. Power transmission mechanism comprising, a driving member, a driven member, gears, means for connecting said members through said gears to revolve at the same speed, a second means for connecting said members through said gears to revolve at different speeds, an operating member movable in one or the other direction to make the second or first connection respectively, centrifugal weights operable outwardly to move said operating member in the one direction to make the second and unmake the first connection, a coarse pitch screw rotatable by one of said gears by the torque load on said gear, operative when either connection is in effect, a nut on said screw movable by turning of said screw to hold said operating members to prevent the second connection being made or to move said operating member to cause said second connection to be unmade after it has been made, and a spring expansible in two directions, the one to return the nut to its unoperated position and the other to return the operating member to the first position and the weights to their unoperated position.

8. Power transmission mechanism comprising, a driving member, a driven member, gears, means for connecting said members to revolve at the same speed, a second means for connecting said members through said gears to revolve at different speeds, an operating member movable from a first to a second position to respectively make the first or second connection, centrifugal weights operable from an "in" to an "out" position to move said operating member from the first to the second position, torque responsive means adapted under torque load on one of said gears to force said weights inwardly, and spring means under stress urging said torque responsive means to its unoperated position, the weights to the "in" position, the operating member to its first position and also applying its pressure to the first connecting means to keep it connected.

9. Power transmission mechanism comprising, a driving member, a driven member, gears, means for connecting said members to revolve at the same speed, a second means for connecting said members through said gears to revolve at different speeds, an operating member movable from a first to a second position to respectively make the first or second connection, centrifugal weights operable from an "in" to an "out" position to move said operating member from the first to the second position, torque responsive means adapted, by torque load on one of said gears, to hold said operating member in the first position or return it thereto, spring means adapted to apply pressure to respectively keep the first or second connecting means in effect when the operating means is in the first or second position, and a second spring means under stress urging said torque responsive means to its unoperated position, the weights to their "in" position, the operating member to its first position and also applying its full pressure to assist the first spring means to maintain the first connection.

10. Power transmission mechanism comprising, a driving member, a driven member, a ring gear on the driven member, planet pinions carried on the driving member in mesh with said ring gear, a sun gear in mesh with said planet pinions, a clutch for connecting said sun gear to the driving member, a brake for holding said sun gear against rotation, a coarse pitch screw on the sun gear, a nut on said screw operative by torque load on said sun gear to urge said clutch to remain engaged when it is engaged and to urge said brake to be disengaged when it is engaged.

11. Power transmission mechanism comprising, a driving member, a driven member, a ring gear on the driven member, planet pinions carried on the driving member in mesh with said ring gear, a sun gear in mesh with said planet pinions, a clutch for connecting said sun gear to the driving member, a brake for holding said sun gear non-rotative, an operating member movable from a first to a second position to respectively release the clutch and apply the brake, a coarse pitch screw rotatable by the sun gear by torque load on said sun gear, a nut on said screw adapted, by rotation of said screw, to hold said operating member in the first position or to return it thereto, and centrifugal weights operative from an "in" to an "out" position to respectively move said operating member from the first to the second position.

12. Power transmission mechanism comprising, a driving member, a driven member, a ring gear on the driven member, planet pinions carried on the driving member in mesh with said ring gear, a sun gear in mesh with said planet pinions, a clutch for connecting said sun gear to the driving member, a brake for holding said sun gear non-rotative, an operating member movable from a first to a second position to respectively release the clutch and apply the brake, a coarse pitch screw rotatable by the sun gear by torque load on said sun gear, a nut on said screw adapted by rotation of said screw to hold said operating member in the first position or return it thereto, centrifugal weights operative from an "in" to an "out" position to respectively move said operating member from the first to the second position, and a spring for holding said nut away from said operating member.

13. Power transmission mechanism comprising, a driving member, a driven member, a ring gear on the driven member, planet pinions carried on the driving member in mesh with said ring gear, a sun gear in mesh with said planet pinions, a clutch for connecting said sun gear to the driving member, a brake for holding said sun gear non-rotative, an operating member movable from a first to a second position to respectively release the clutch and apply the brake, a coarse pitch screw rotatable by the sun gear by torque load on said sun gear, a nut on said screw adapted, by rotation of said screw, to hold said operating member in the first position or return it thereto, centrifugal weights operative from an "in" to an "out" position to respectively move said operating member from the first to the second position, and a spring for holding said nut away from said operating member, for holding said operating member in the first position and for holding said weights to their "in" position.

14. Power transmission mechanism comprising, a driving member, a driven member, a ring gear on the driven member, planet pinions carried on the driving member in mesh with said ring gear, a sun gear in mesh with said planet pinions, a clutch for connecting said sun gear to the driving member, a brake for holding said sun gear non-rotative, an operating member movable from a first to a second position to respectively release the clutch and apply the brake, a coarse pitch screw rotatable by said sun gear by torque load on said sun gear, a nut on said screw adapted, by rotation of said screw, to hold said operating member in the first position or return it thereto, centrifugal weights operative from an "in" to an "out" position to respectively move said operating member from the first to the second position, and a spring urging said nut away from the operating member, said operating member to its first position, said weights to the "in" position, and said clutch to the engaged position.

15. Power transmission mechanism comprising, a driving member, a driven member, a ring gear on the driven member, planet pinions on the driving member in mesh with said ring gear, a sun gear in mesh with said planet pinions, a clutch for connecting said sun gear to the driving member, a brake for holding said sun gear non-rotative, an operating member movable from a first to a second position to respectively release the clutch and apply the brake, a coarse pitch screw rotatable by said sun gear by torque load on said sun gear, a nut on said screw adapted, by rotation of said screw, to hold the operating member in the first position, and means for applying the pressure of said nut through said operating member to said clutch to maintain engagement of said clutch.

16. Power transmission mechanism comprising, a driving member, a driven member, a ring gear on the driven member, planet pinions on the driving member in mesh with said ring gear, a sun gear in mesh with said planet pinions, a clutch for connecting said sun gear to the driving member, a brake for holding said sun gear non-rotative, resilient means under stress adapted to be applied either to the clutch or to the brake to maintain engagement, an operating member movable from a first to a second position to transfer said stress from the clutch to the brake, a coarse pitch screw on the sun gear rotatable by torque load on said sun gear, a nut on said screw adapted, by rotation of said screw, to hold the operating member in the first position, centrifugal weights operative from an "in" to an "out" position to respectively move said operating member from the first to the second position, and a spring operative to hold said nut away from the operating member, to hold said operating member in the first position and the weights to the "in" position and to apply additional stress to the clutch to maintain engagement.

17. Power transmission mechanism comprising, a housing, a driving member, a driven member, a ring gear on the driven member, planet pinions carried on the driving member in mesh with said ring gear, a sun gear in mesh with said planet pinions, a coarse pitch screw on the sun gear, a nut on said screw, a shiftable member, carrying clutch and brake elements, splinedly mounted on said nut, mating clutch elements carried by said driving member and mating brake elements carried by said housing, resilient means under stress carried by said shiftable member adapted to be applied either to the clutch or to the brake elements to effect clutch or brake engagement, an operating member movable from a first to a second position to transfer said stress from the clutch to the brake, centrifugal weights operative from an "in" to an "out" position to respectively move said operating member from the first to the second position, a spring operative to return said weights to the "in" position, and means to apply the stress of said spring to the shiftable member to assist clutch engagement.

FREDERICK W. COTTERMAN.